(12) United States Patent
Liao

(10) Patent No.: US 12,211,470 B2
(45) Date of Patent: Jan. 28, 2025

(54) QUICK-DETACHABLE AND REPLACEABLE MUSICAL INSTRUMENT HOLDER

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 252 days.

(21) Appl. No.: 17/971,291

(22) Filed: Oct. 21, 2022

(65) Prior Publication Data

US 2024/0135903 A1 Apr. 25, 2024
US 2024/0233689 A9 Jul. 11, 2024

(51) Int. Cl.
*G10G 5/00* (2006.01)
*F16M 11/04* (2006.01)

(52) U.S. Cl.
CPC .............. *G10G 5/00* (2013.01); *F16M 11/041* (2013.01)

(58) Field of Classification Search
CPC ...... G10G 5/00; F16M 11/041; F16M 11/046; F16M 11/245
See application file for complete search history.

(56) References Cited

U.S. PATENT DOCUMENTS

| | | | | |
|---|---|---|---|---|
| 6,036,159 A * | 3/2000 | Yu | ............................ | G10G 5/00 248/443 |
| 6,484,977 B1 * | 11/2002 | Yu | ............................ | G10G 5/00 84/327 |
| 7,258,320 B2 | 8/2007 | Tai | | |
| 7,906,717 B2 * | 3/2011 | Wang | ....................... | G10G 5/00 84/327 |
| 10,679,594 B2 | 6/2020 | Schmidt et al. | | |
| 10,957,288 B2 | 3/2021 | Reeder et al. | | |
| 11,330,352 B2 | 5/2022 | Athan | | |
| 11,525,542 B2 * | 12/2022 | Liao | ....................... | F16M 11/10 |
| 11,543,058 B2 * | 1/2023 | Liao | ...................... | F16L 21/065 |
| 11,713,843 B2 * | 8/2023 | Chu | ....................... | F16M 11/048 248/371 |
| 2008/0265116 A1 * | 10/2008 | Chen | ....................... | G10G 5/00 248/291.1 |

* cited by examiner

*Primary Examiner* — Bradley Duckworth
(74) *Attorney, Agent, or Firm* — MUNCY, GEISSLER, OLDS & LOWE, P.C.

(57) ABSTRACT

A quick-detachable and replaceable musical instrument holder includes at least one quick-detachable seat and at least one quick-detachable rod. The at least one quick-detachable seat includes a quick-detachable connector, a quick-detachable control latch and a reset part, and the quick-detachable rod includes an insertion rod and a holder body. The quick-detachable connector is provided with an insertion hole for inserting the insertion rod. A through hole penetrates transversely through the insertion hole. The quick-detachable control latch includes a cylinder, a pressing part and a protrusion are respectively provided at both ends of the cylinder. A notch including a bare section and a stopper section is provided in the middle of the cylinder. The stopper section is provided with a block.

5 Claims, 5 Drawing Sheets

QUICK-DETACHABLE AND REPLACEABLE MUSICAL INSTRUMENT HOLDER

FIELD OF THE INVENTION

The invention relates to musical instrument holders, and particularly to a musical instrument holder in which a holder body can be quickly detached and replaced.

BACKGROUND OF THE INVENTION

When playing music, musical instruments and auxiliary equipment are fixed in the instrumental performance site by using various musical instrument holders for the performers' convenience.

In order to fix musical instruments and equipment such as music stands, microphones, tablet computers, etc. during the performance, various holders provided in U.S. Pat. Nos. 10,957,288 B2, 10,679,594 B2, 7,258,320 B2, 11,330,352 B2, etc. may be used.

The various holders described above are customized according to the musical instruments or equipment to be fixed. A conventional holder is usually limited to a single function and is incompatible for different musical instruments or equipment. The same musical instruments with different sizes also have to be fixed on different holders. Therefore, a performer needs to prepare a special holder for each musical instrument and equipment, which not only consumes a lot of money but also occupies a lot of space. Obviously, improvement is needed.

SUMMARY OF THE INVENTION

Accordingly, it is a primary object of the invention to provide a musical instrument holder having a quick-detachable structure that is quickly removed and replaced with different holder bodies to meet the needs of different musical instruments.

To achieve the above objects of the invention, the invention provides a quick-detachable and replaceable musical instrument holder, including a vertical pipe, a stand, at least one quick-detachable seat and at least one quick-detachable rod. The stand is fixed with the vertical pipe and supports the vertical pipe to stand. The at least one quick-detachable seat is fixed to the vertical pipe, and each of the at least one quick-detachable seat includes a quick-detachable connector, a quick-detachable control latch, a reset part and a baffle plate. The quick-detachable connector is provided with an insertion hole and a through hole penetrating transversely through the insertion hole, the through hole includes a first passage and a second passage respectively at both sides of the insertion hole, and the second passage includes a stop edge at a junction with the insertion hole. The quick-detachable control latch includes a cylinder with a contour corresponding to the first passage, a pressing part formed at one end of the cylinder, and a protrusion extending transversely from the other end of the cylinder opposite to the pressing part; the cylinder is hollowed between the pressing part and the protrusion to form a notch, the notch includes a bare section and a stopper section, and the notch is provided with a block at the stopper section. The pressing part penetrates into the through hole via the second passage and passes through the insertion hole and the first passage, the baffle plate is fixed on the quick-detachable connector and covers the second passage, the reset part is provided in the second passage and is located between the baffle plate and the cylinder. The reset part pushes the cylinder so that the protrusion presses against the stop edge, the insertion hole crosses over the stopper section, and the pressing part protrudes outside the first passage.

The at least one quick-detachable rod includes an insertion rod and a holder body connecting the insertion rod, the insertion rod includes a groove. When the pressing part is pushed to press the reset part and submerged in the first passage, the bare section is in the insertion hole, allows the insertion rod to be inserted into the insertion hole and pass through the bare section until the through hole crosses over the groove, and when the reset part moves the cylinder to re-position the stopper section to be in the insertion hole, the block is clamped into the groove to fix the at least one quick-detachable rod.

Accordingly, the pressing part is pressed to be submerged in the first passage to control the insertion hole to cross over the bare section or the stopper section. When the insertion hole crosses over the bare section, the insertion rod is inserted into the insertion hole until the through hole crosses over the groove. The block is clamped into the groove to fix the quick-detachable rod when the insertion hole crosses over the stopper section. According to this, pressing the pressing part determines whether the block clamps and fixes the quick-detachable rod, thereby forming a quick-detachable structure. The quick-detachable rod can be replaced according to requirements, so that the holder body of the quick-detachable rod can meet the requirements in use.

DETAILED DESCRIPTION OF THE PREFERRED EMBODIMENTS

The technical content of the invention is illustrated as follows with reference to the drawings.

Figure 1:
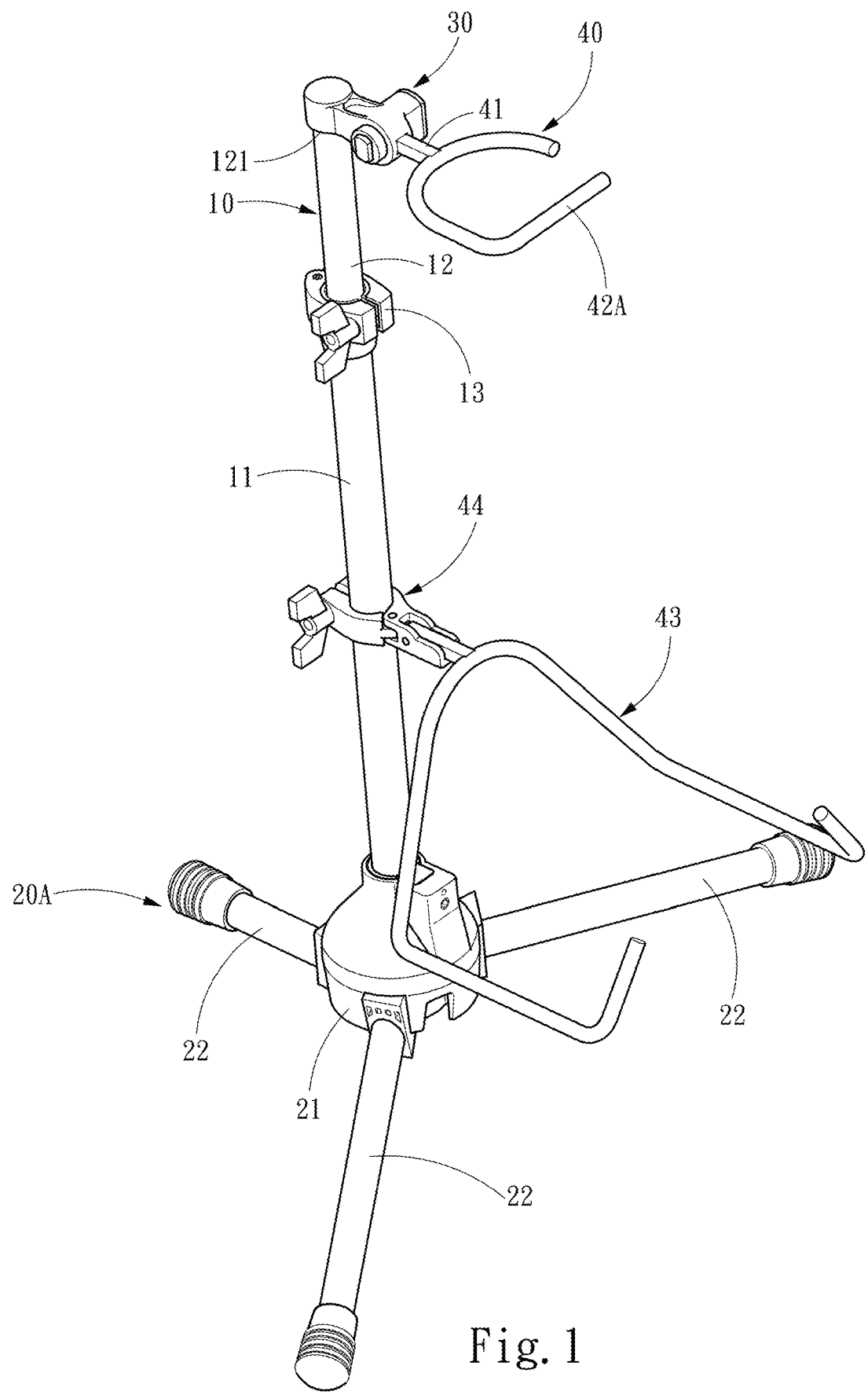
FIG. 1 is a perspective view of the invention.

Referring to FIG. 1, the invention is a quick-detachable and replaceable musical instrument holder including a vertical pipe 10, a stand 20A, at least one quick-detachable seat 30 and at least one quick-detachable rod 40. Herein, the stand 20A is fixed with the vertical pipe 10 and supports the vertical pipe 10 to stand. In an embodiment, the stand 20A includes a seat body 21 and three standing feet 22, the three standing feet 22 are pivotally connected to the seat body 21 to form a stable and supportive structure supporting the vertical pipe 10 to stand. The vertical pipe inserts to the seat body 21.

Figure 2:
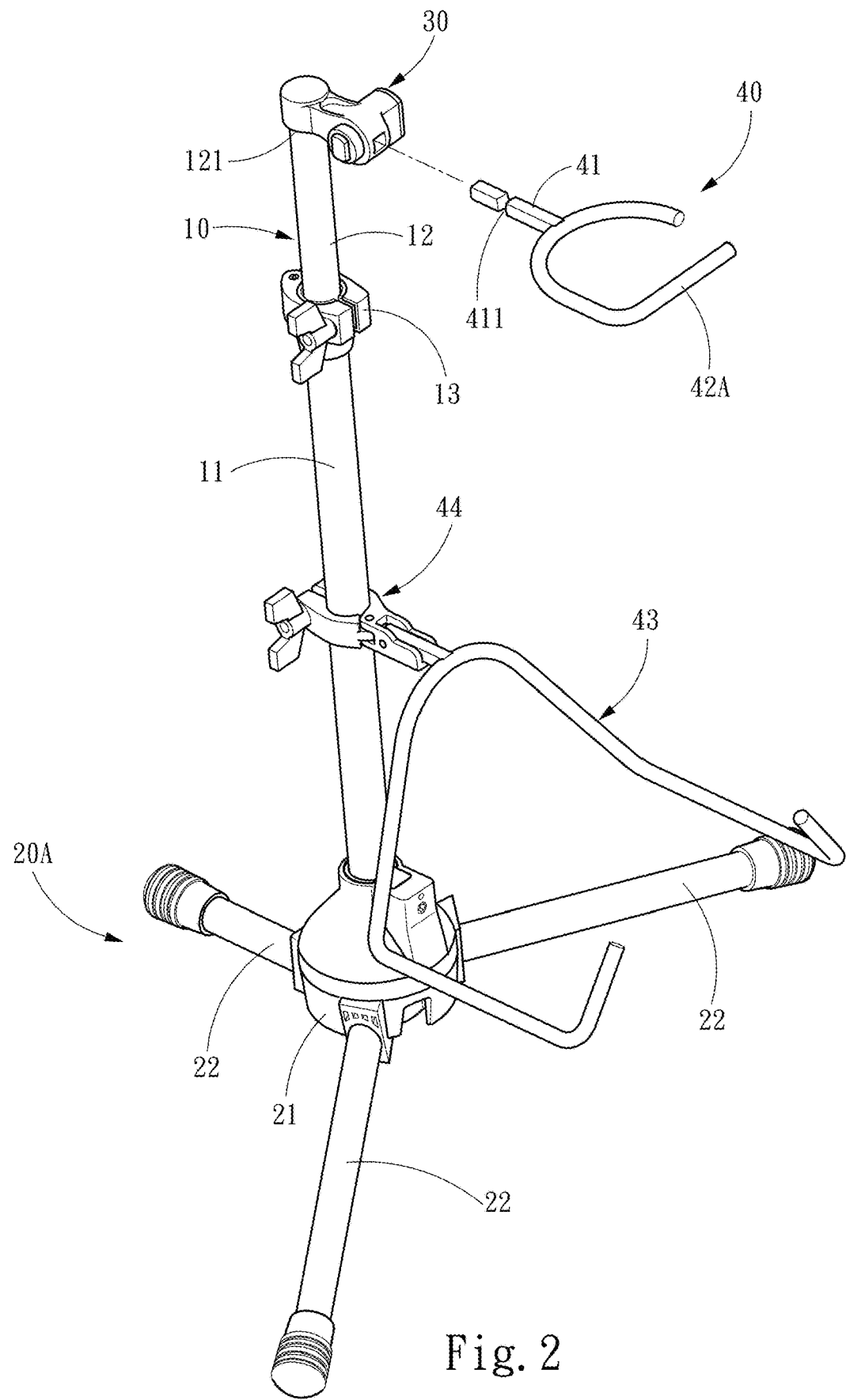
FIG. 2 is a schematic diagram of the installation of a quick-detachable rod of the invention.

Referring to FIG. 2, the at least one quick-detachable seat 30 is fixed to the vertical pipe 10. In an embodiment, one quick-detachable seat 30 and one quick-detachable rod 40 are provided, the vertical pipe 10 includes an outer pipe 11, an inner pipe 12 and a telescopic lock 13, the telescopic lock 13 is fixed to the outer pipe 11 for clamping the inner pipe 12 to fix the relative positions of the outer pipe 11 and the inner pipe 12 so that the height of the vertical pipe 10 is adjusted, and the quick-detachable seat 30 is provided at a top end 121 of the inner pipe 12.

Figure 3:
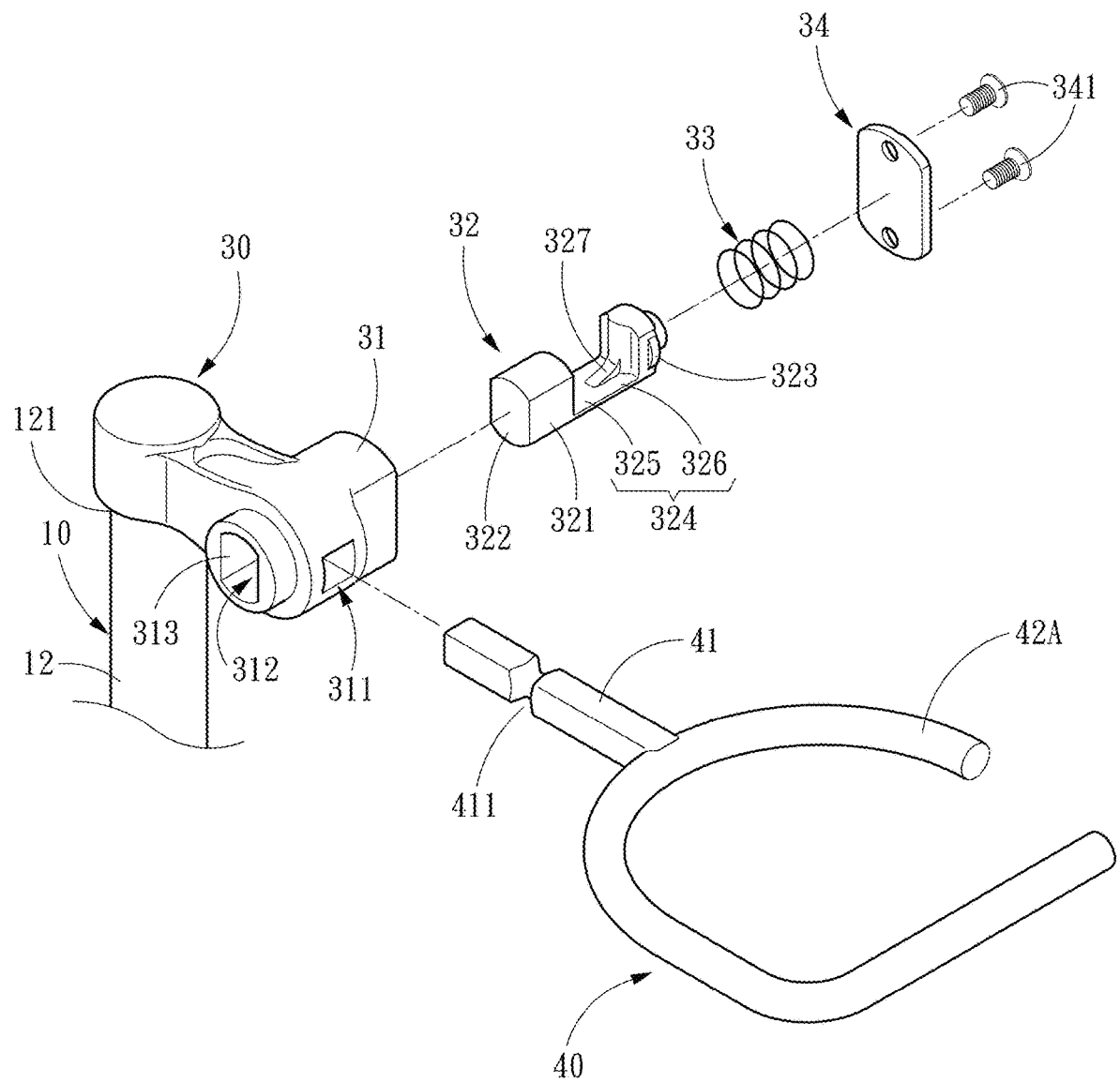
FIG. 3 is a partial exploded view of the invention.
Figure 4:
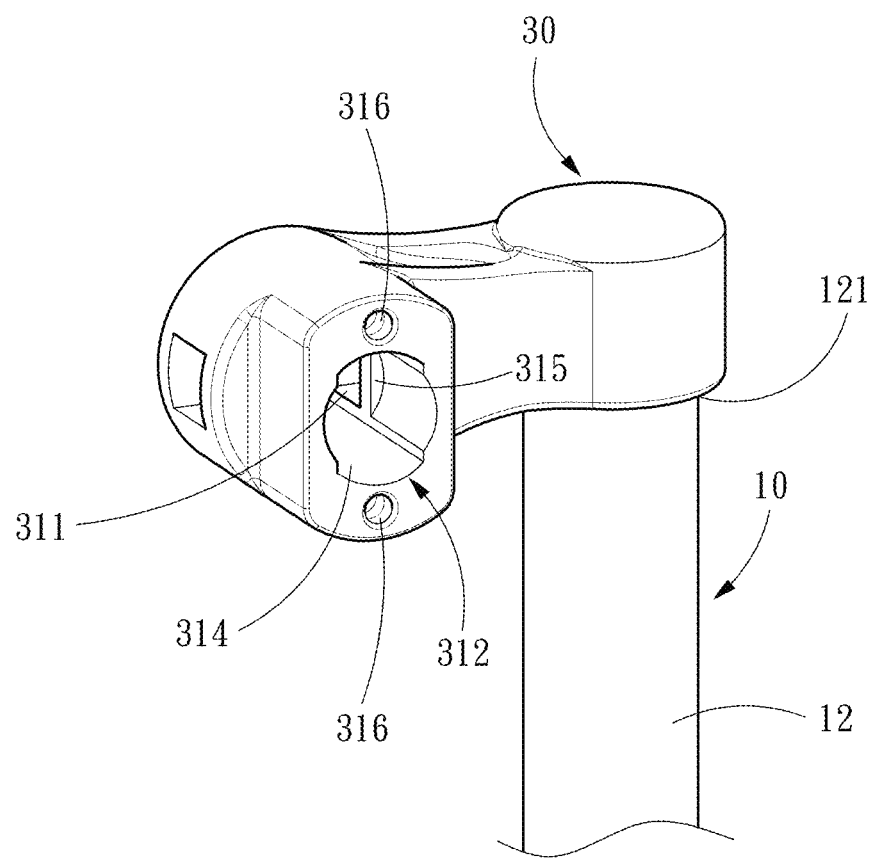
FIG. 4 is a perspective view of the quick-detachable connector of the invention from another perspective.

Referring to FIGS. 3 and 4, the quick-detachable seat 30 includes a quick-detachable connector 31, a quick-detachable control latch 32, a reset part 33, and a baffle plate 34. The quick-detachable connector 31 is provided with an insertion hole 311 and a through hole 312 penetrating transversely through the insertion hole 311. The through hole 312 includes a first passage 313 and a second passage 314 respectively at both sides of the insertion hole 311. The second passage 314 includes a stop edge 315 at a junction with the insertion hole 311. The quick-detachable control latch 32 includes a cylinder 321 with a contour corresponding to the first passage 313, a pressing part 322 formed at one end of the cylinder 321, and a protrusion 323 extending transversely from the other end of the cylinder 321 opposite to the pressing part 322. The cylinder 321 is hollowed between the pressing part 322 and the protrusion 323 to form a notch 324. The notch 324 includes a bare section 325 and a stopper section 326. The notch 324 is provided with a block 327 at the stopper section 326. In addition, the pressing part 322 penetrates into the through hole 312 via the second passage 314 and passes through the insertion hole 311 and the first passage 313. The baffle plate 34 is fixed on the quick-detachable connector 31 and covers the second passage 314. Two screws 341 fix the baffle plate 34 to a threaded hole 316 of the quick-detachable connector 31. The reset part 33 is provided in the second passage 314 and is located between the baffle plate 34 and the cylinder 321. The reset part 33 pushes the cylinder 321 so that the protrusion 323 presses against the stop edge 315, the insertion hole 311 crosses over the stopper section 326, and the pressing part 322 protrudes outside the first passage 313 (as shown in FIG. 2). In addition, the at least one quick-detachable rod 40 includes an insertion rod 41 and a holder body 42A. The holder body 42A is connected to the insertion rod 41. The insertion rod includes a groove 411. When the pressing part 322 is pushed to press the reset part 33 and submerged in the first passage 313, the bare section 325 is in the insertion hole 311, allows the insertion rod 41 to be inserted into the insertion hole 311 and pass through the bare section 325 until the through hole 312 crosses over the groove 411. When the reset part 33 moves the cylinder 321 to re-position the stopper section 326 to be in the insertion hole 311, the block 327 is clamped into the groove 411 to fix the at least one quick-detachable rod 40.

As shown in FIG. 1, the invention further includes a carrier body 43 pivotally connected to a carrier lock 44. The carrier lock 44 is fastened to the outer pipe 11. The carrier body 43 cooperates with the holder body 42A of the at least one quick-detachable rod 40 to provide a guitar stand.

Figure 5:
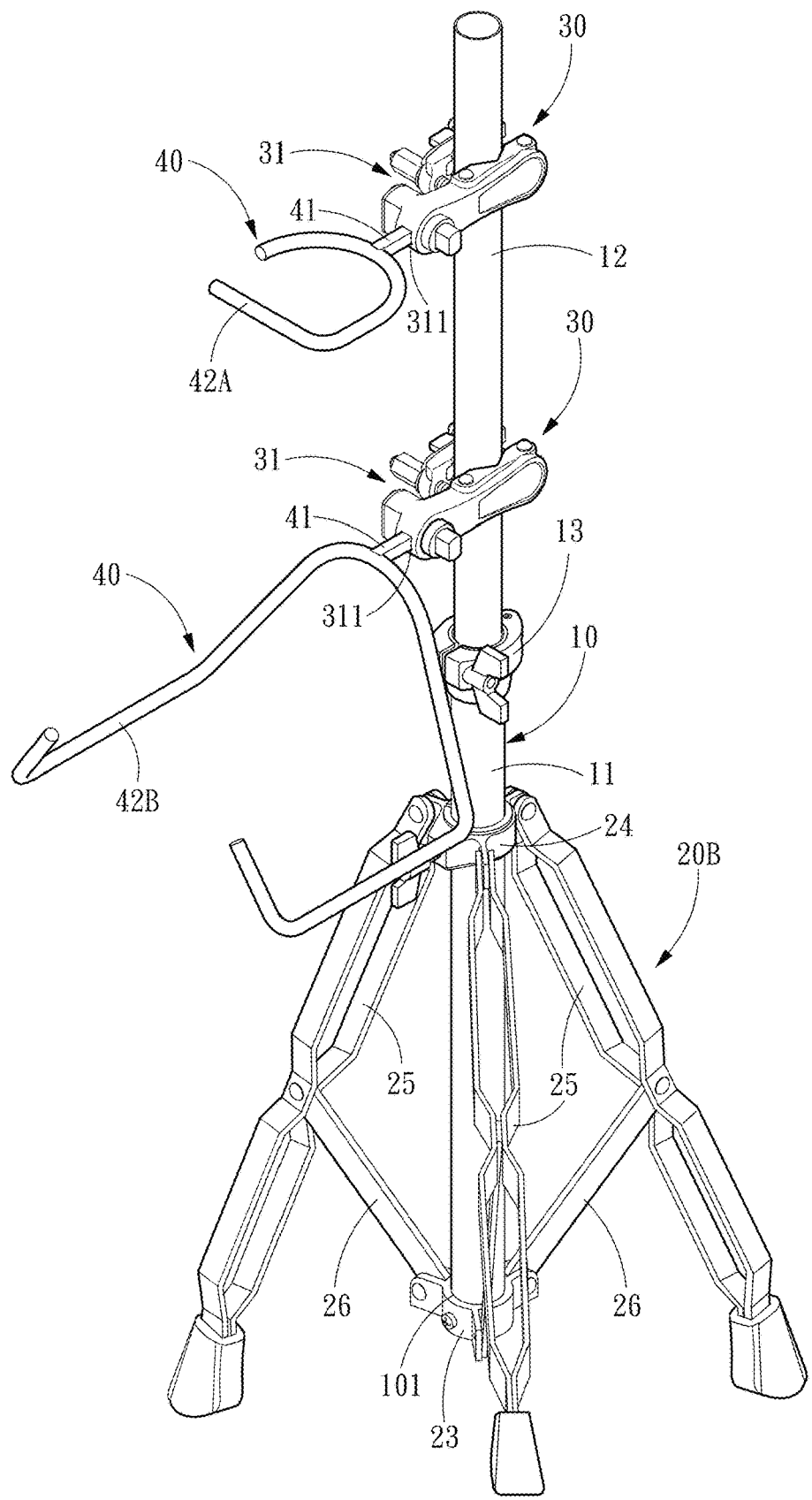
FIG. 5 is a perspective view of another embodiment of the invention.

Referring to FIG. 5, another embodiment of the invention is shown. The stand 20B includes a fixing ring 23 fixed to a bottom end 101 of the vertical pipe 10, an adjusting clamp 24 locked to the vertical pipe 10, three support rods 25 separately connected to the adjusting clamp 24, and three connecting rods 26 separately connected to the fixing ring 23 and respectively connected to the three support rods 25. It also forms a stable supporting structure to support the vertical pipe 10 to stand. In addition, the vertical pipe 10 also includes the outer pipe 11, the inner pipe 12 and the telescopic lock 13. Two quick-detachable seats 30 and two quick-detachable rods 40 are provided. The two quick-detachable seats 30 are respectively locked to the inner pipe 12 so as to respectively fix the two quick-detachable connectors 31 at different heights. The insertion rods 41 of the two quick-detachable rods 40 are respectively inserted into the insertion holes 311 of the two quick-detachable connectors 31, and two holder bodies 42A, 42B of the two quick-detachable rods 40 each have different profiles, such as the shape shown in FIG. 5. The two holder bodies 42A, 42B are used as guitar stands.

As described above, the invention has the following characteristics: 1. through the pressing part, it determines whether the block clamps and fixes the quick-detachable rod to form a quick-detachable structure, and the quick-detachable rod is allowed to be replaced according to requirements of the user, so that the holder body of the quick-detachable rod is shaped to form a universal musical instrument holder. 2. One or more of these quick-detachable seats is provided according to the requirements of actual use and is used with different types of stands and vertical pipes.

What is claimed is:

1. A quick-detachable and replaceable musical instrument holder, comprising:
   a vertical pipe;
   a stand, fixed with the vertical pipe and supporting the vertical pipe to stand;
   at least one quick-detachable seat, fixed to the vertical pipe, wherein each of the at least one quick-detachable seat comprises a quick-detachable connector, a quick-detachable control latch, a reset part and a baffle plate; the quick-detachable connector is provided with an insertion hole and a through hole penetrating transversely through the insertion hole, the through hole includes a first passage and a second passage respectively at both sides of the insertion hole, and the second passage includes a stop edge at a junction with the insertion hole; the quick-detachable control latch includes a cylinder with a contour corresponding to the first passage, a pressing part formed at one end of the cylinder, and a protrusion extending transversely from an other end of the cylinder opposite to the pressing part; the cylinder is hollowed between the pressing part and the protrusion to form a notch, the notch includes a bare section and a stopper section, and the notch is provided with a block at the stopper section; the pressing part penetrates into the through hole via the second passage and passes through the insertion hole and the first passage; the baffle plate is fixed on the quick-detachable connector and covers the second passage; the reset part is provided in the second passage and is located between the baffle plate and the cylinder; and the reset part pushes the cylinder so that the protrusion presses against the stop edge, the insertion hole crosses over the stopper section, and the pressing part protrudes outside the first passage; and
   at least one quick-detachable rod, wherein each of the at least one quick-detachable rod includes an insertion rod and a holder body connecting the insertion rod, the insertion rod comprises a groove; when the pressing part is pushed to press the reset part and submerged in the first passage, the bare section is in the insertion hole, allowing the insertion rod to be inserted into the insertion hole and pass through the bare section until the through hole crosses over the groove; and when the reset part moves the cylinder to re-position the stopper section to be in the insertion hole, the block is clamped into the groove to fix the at least one quick-detachable rod.

2. The quick-detachable and replaceable musical instrument holder according to claim 1, wherein the stand comprises a fixing ring fixed to a bottom end of the vertical pipe, an adjusting clamp locked to the vertical pipe, three support rods separately connected to the adjusting clamp, and three connecting rods separately connected to the fixing ring and respectively connected to the three support rods.

3. The quick-detachable and replaceable musical instrument holder according to claim 1, wherein the stand comprises a seat body and three standing feet pivotally connected to the seat body, the vertical pipe inserts to the seat body.

4. The quick-detachable and replaceable musical instrument holder according to claim 1, wherein the vertical pipe comprises an outer pipe, an inner pipe and a telescopic lock fixed to the outer pipe for clamping the inner pipe to fix the relative position of the outer pipe and the inner pipe, and the quick-detachable seat is provided at a top end of the inner pipe.

5. The quick-detachable and replaceable musical instrument holder according to claim 1, wherein two quick-detachable seats and two quick-detachable rods are provided, and the holder body of each of the two quick-detachable rods has different profiles.

* * * * *